United States Patent [19]

Nord et al.

[11] 4,221,519
[45] Sep. 9, 1980

[54] CONVEYING AND STACKING MACHINE

[75] Inventors: Keith W. Nord, Stillwater; Joseph G. Quast, North St. Paul; William H. Williams, Maplewood; Naaman W. Willmore, St. Paul; Ronald B. Benson, Stillwater, all of Minn.

[73] Assignee: Ex-Cell-O Corporation, Troy, Mich.

[21] Appl. No.: 948,134

[22] Filed: Oct. 3, 1978

[51] Int. Cl.³ .................... B65G 57/24; B65G 57/30
[52] U.S. Cl. ........................... 414/49; 414/95; 414/101; 414/110; 414/397
[58] Field of Search ............ 414/41, 43, 48, 49, 414/92, 95, 96, 101, 102, 126, 110, 276, 391, 397; 198/448

[56] References Cited

U.S. PATENT DOCUMENTS

| | | | |
|---|---|---|---|
| 2,966,018 | 12/1960 | Currie | 414/95 X |
| 2,979,872 | 4/1961 | Verrinder | 414/110 X |
| 3,070,240 | 12/1962 | Barriol | 414/110 X |
| 3,392,852 | 7/1968 | Tegner | 414/101 X |
| 3,442,400 | 5/1969 | Roth et al. | 414/43 |
| 3,866,763 | 2/1975 | Alduk | 414/96 X |

FOREIGN PATENT DOCUMENTS

133403 3/1960 U.S.S.R. ..................................... 414/92

Primary Examiner—L. J. Paperner
Attorney, Agent, or Firm—John P. Moran

[57] ABSTRACT

The drawings illustrate a conveying and stacking machine for handling basket trays and dollies. This machine includes a dual-speed conveyor adapted to receive basket trays, a chute mounted at a predetermined converging angle above the entrance portion of the conveyor and adapted to receive dollies, an end portion pivotally connected to the downstream end of the chute for at times pivotting into close proximity to the conveyor, a magazine for storing two aligned stacks of dollies, a stacking mechanism for receiving and stacking the trays in end-to-end stacks of a predetermined number per stack and calling for a pair of dollies from the chute, if available, or otherwise from the magazine, the dollies thereupon receiving the respective stacks of basket trays and conveying the two assembled basket tray and dolly stacks at a decreased speed to the exit portion of the conveyor.

10 Claims, 11 Drawing Figures

CONVEYING AND STACKING MACHINE

This invention relates generally to conveying systems and, more particularly, to conveying systems having a stacking mechanism associated therewith.

A general object of the invention is to provide an improved conveyor and stacking means wherein basket trays are conveyed and automatically stacked to a predetermined number at a stacking station and then placed on dollies automatically released from a separate source onto the conveyor, the resultant combination being conveyed to a discharge point, with the cycle automatically repeating.

Another object of the invention is to provide an improved conveyor and stacking means wherein basket trays are conveyed at one speed and automatically stacked to a predetermined number in each of two stacks and then placed on a pair of dollies automatically released from a separate source onto the conveyor, the resultant combination being conveyed to a discharge point at a slower speed, with the cycle automatically repeating.

A further object of the invention is to provide conveyor and stacking means wherein basket trays are automatically conveyed at one speed and stacked to a predetermined number in each of two stacks and placed on a pair of dollies automatically released and conveyed from one of two possible sources at the same speed, the resultant combination being conveyed to a discharge ramp at a slower speed, with the cycle automatically repeating.

Still another object of the invention is to provide an endless conveyor for receiving and conveying basket trays, a chute with a pivotally mounted end portion for at times releasing a pair of dollies onto the endless conveyor, a magazine section for storing dollies and releasing a pair of dollies onto the endless conveyor when no dollies are available from the chute and its pivotally mounted end portion, stacking means for stacking the basket trays in two aligned stacks, and counting means for counting the basket trays being conveyed and signalling for a pair of dollies from one of the two sources after a predetermined number of basket trays have been counted, the stacking means thereupon automatically depositing the two aligned stacks onto the pair of dollies and conveying the two assembled basket tray and dolly stacks to the exit position of the conveyor.

These and other objects and advantages of the invention will be apparent when reference is made to the following description and accompanying drawings, wherein:

Figure 1:
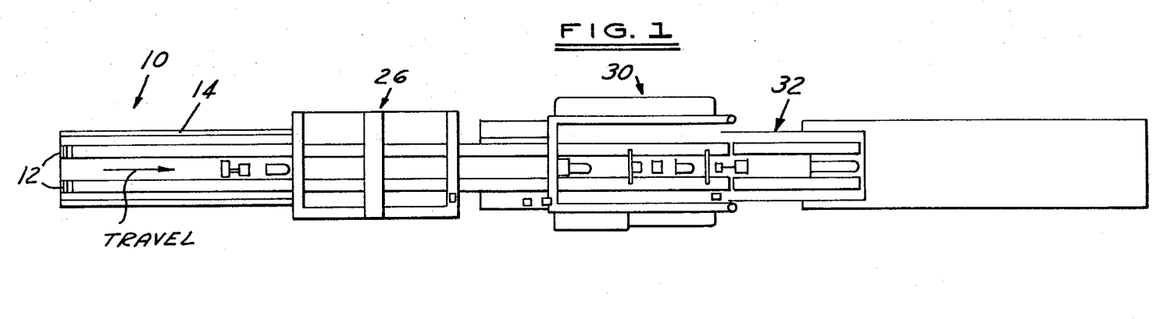
FIG. 1 is a plan view of a conveyor and stacking system embodying the invention.
Figure 2:
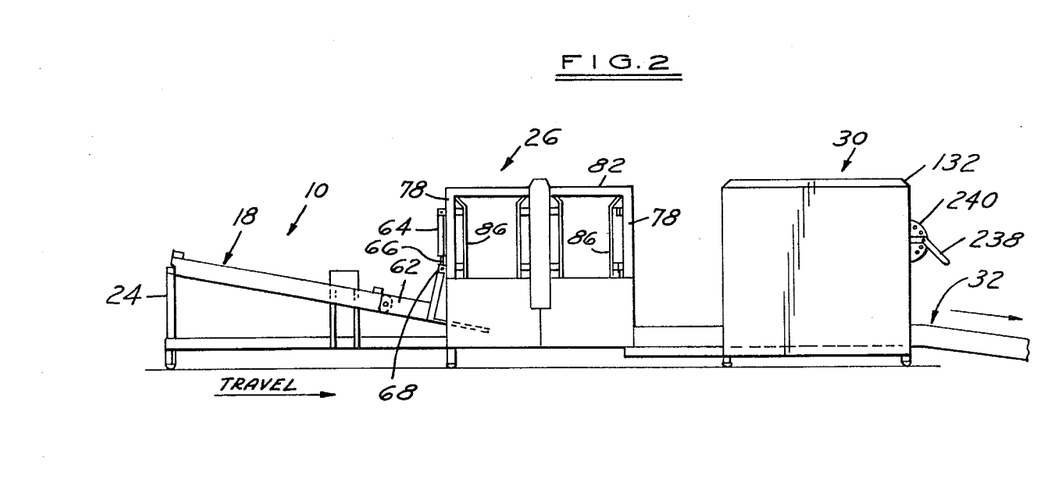
FIG. 2 is a side elevational view of the FIG. 1 arrangement.

Referring now to the drawings in greater detail, FIGS. 1 and 2 illustrate conveyor and stacker mechanism 10 including, generally, an endless conveyor 12 mounted on a frame 14 for receiving baskets or basket trays, represented at 16, which may be formed of plastic, wire or wood. A channel-shaped holding chute 18 for receiving and storing a pair of dollies or pallets, represented at 20, is mounted above the entrance portion of the conveyor 12, supported at the front or receiving end 22 thereof on support posts 24 extending upwardly from the end of the frame 14. The holding chute 18 slopes downwardly at a predetermined angle from the receiving end 22 to a location adjacent a dual station magazine 26 wherein dual stacks of dollies are stored with the outlet end 28 of the chute 18 and the magazine 26 positioned at a predetermined height just above the height of a basket tray moving along the conveyor 12. The conveyor 12 continues through the magazine 26 and into a dual station stacking mechanism 30, and thence out to a discharge ramp 32. The mechanism 10 automatically stacks basket trays 16 in a pair of stacks end-to-end, releases a pair of aligned dollies or pallets 20 onto the conveyor 12 upon conveyance of a predetermined number of basket trays 16, causes the dollies to receive respective stacks of basket trays, and discharges the completed assembly.

Conveyor and Associated Chute Mechanism

Figure 3:
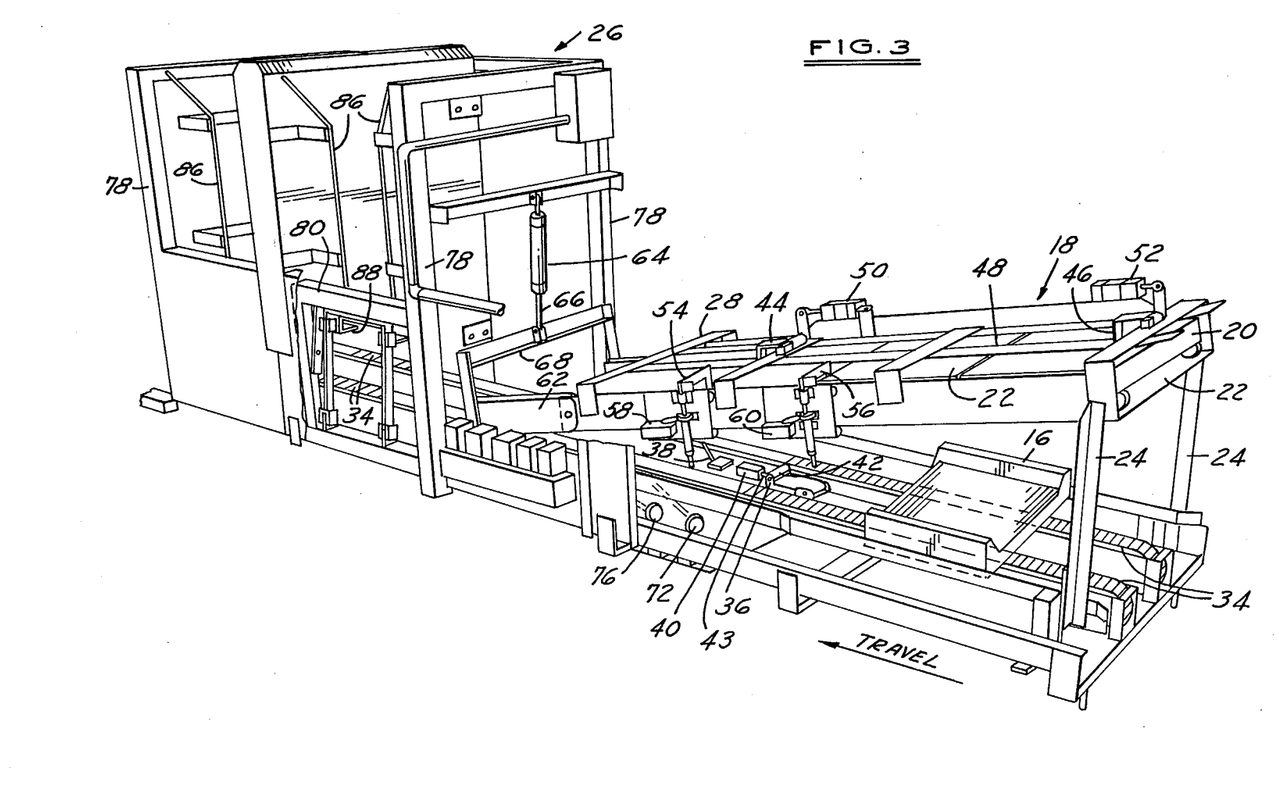
FIG. 3 is an enlarged perspective view of the entrance portion of the FIG. 2 arrangement.

As illustrated in FIGS. 1-3, the endless conveyor 12 includes a pair of laterally spaced endless conveyor chains 34. A stop member 36 is pivotally mounted between the pair of chains 34 a predetermined distance in from the entrance to the conveyor. An electrical switch 38 is mounted downstream of the stop member 36 for actuating a suitable hydraulic or pneumatic cylinder 40. The distal end 42 of the piston rod 43 is shaped so as to be able to raise the pivotable stop member 36 for a purpose to be described.

A pair of longitudinally spaced stop members 44 and 46 are pivotally mounted on a brace member 48 secured at a predetermined location along the center line of the chute 18. The spacing of the stop members 44 and 46 is such that two dollies 20 may fit therebetween, the lower stop member 44 retaining the two dollies, while the upper stop member 46 prevents additional dollies from entering the chute 18 until a predetermined signal is given. The stop members 44 and 46 are actuated by respective hydraulic or pneumatic cylinders 50 and 52.

A pair of longitudinally spaced paddles 54 and 56 are pivotally mounted on one side wall 58 of the chute 18, adapted to at times actuate respective switches 58 and 60. An end portion 62 is pivotally mounted at the outlet end 28 of the chute 18 such that it is pivotable between a position parallel to the top surface of the conveyor chains 34 to a position substantially co-planar with the surface of the chute 18. A hydraulic or pneumatic cylinder 64 is mounted on an outer side of the magazine 26, with the extended piston rod 66 thereof pivotally connected to a cross member 68 secured across and a predetermined height above the surface of the end portion 62, the height being sufficient to clear the height of a dolly or pallet 20.

Figure 10:
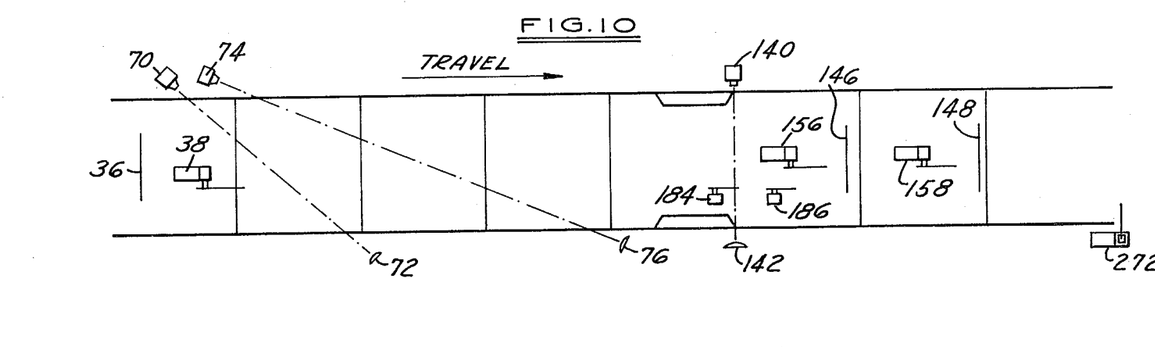
FIG. 10 is a schematic plan view showing particular components of the invention.

A conventional electric eye light source 70 (FIG. 10) and receiver 72 are mounted on the frame 14 so as to be operative across the conveyor chains 34 on a line extending from the vicinity of the stop member 36 to a point just downstream of the distal end of the chute end portion 62. A second electric eye light source 74 (FIG. 10) and receiver 76 are mounted on the frame 14 so as to be operative across the conveyor chains on a line extending from a position adjacent the light source 70 to a point adjacent the outlet end of the magazine 26, functioning in a manner to be described.

Magazine Section

Figure 4:
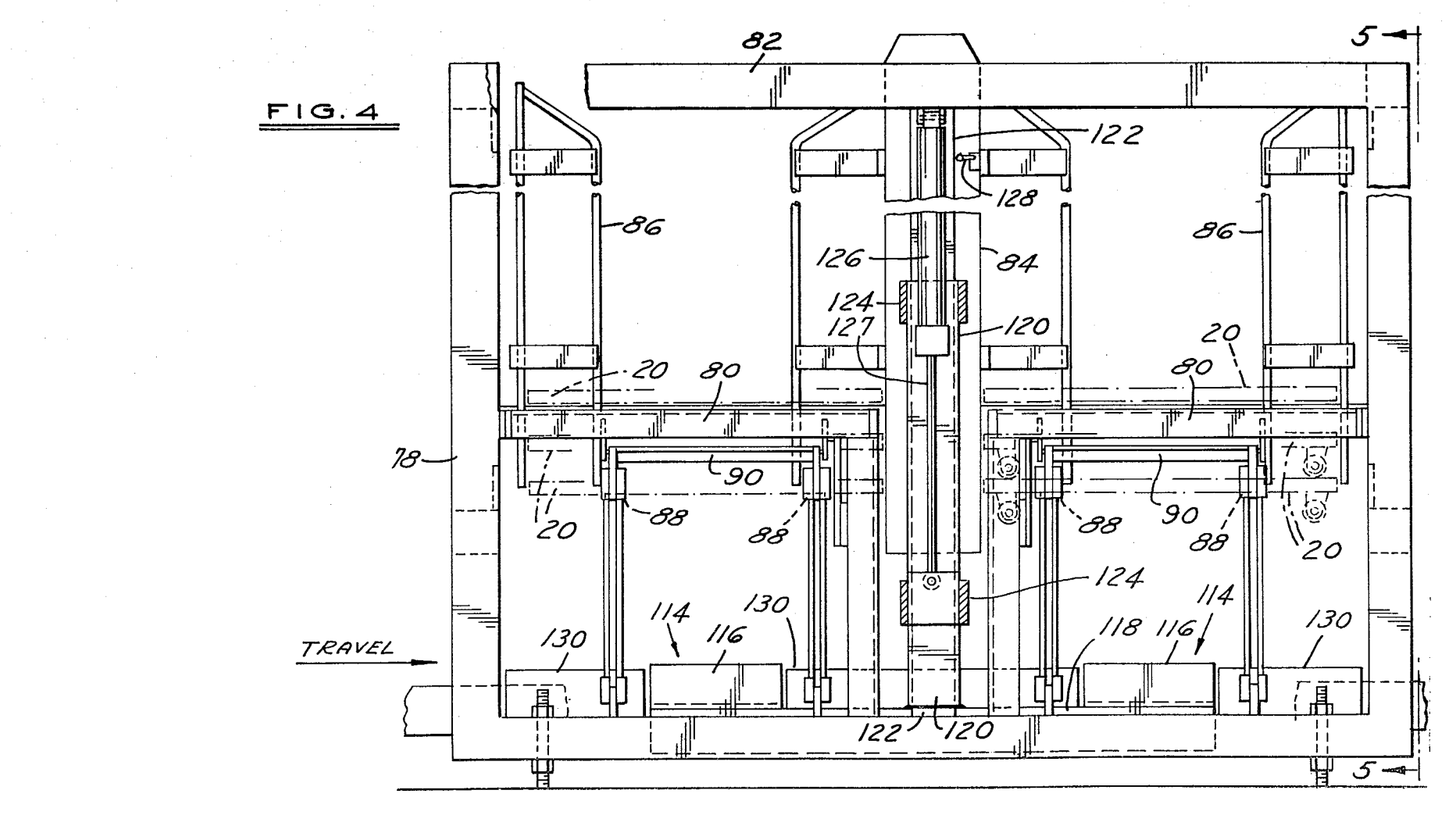
FIG. 4 is an enlarged side elevational view of the magazine portion of the invention.
Figure 5:
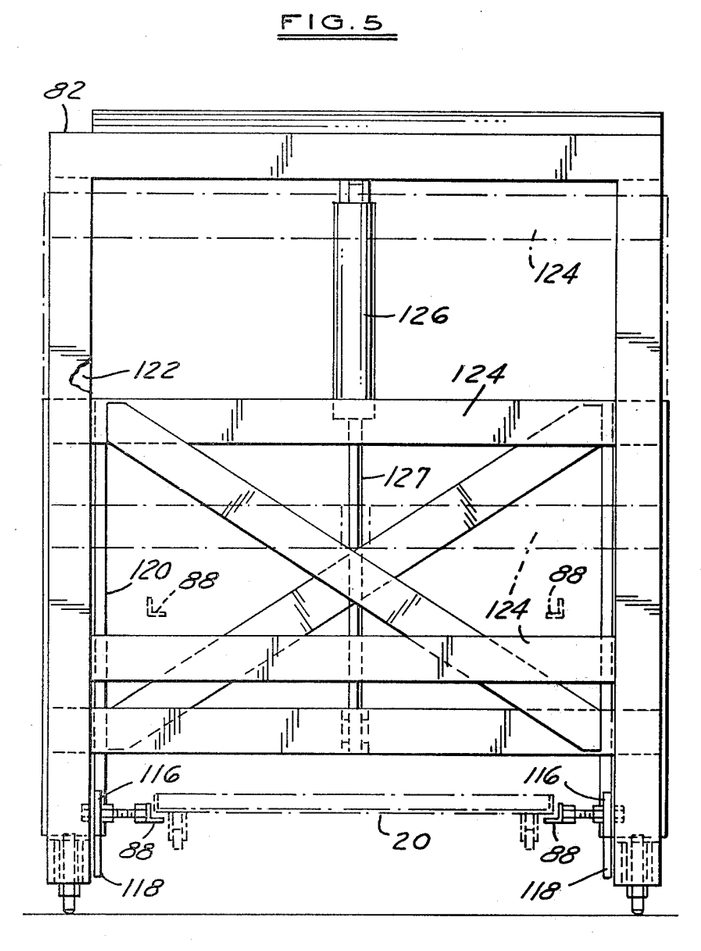
FIG. 5 is an end view taken along the plane of the line 5—5 of FIG. 4, and looking in the direction of the arrows.

As shown in FIGS. 3–5, the magazine 26 consists of framework including four corner posts 78, front and rear upper cross members 80, a rear upper side rail 82, and a laterally extending wall 84 dividing the magazine into dual compartments 86. The front of the magazine 26 remains open at the top in order to accommodate the manual loading therethrough of two stacks of dollies 20 onto two pairs of oppositely disposed, laterally extending support arms 88 in each compartment. A pair of dollies will automatically be lowered from the two compartments 86 onto the chains 34 in the event that no dollies are available from the chute 62, as will be explained.

Figures 6, 7:
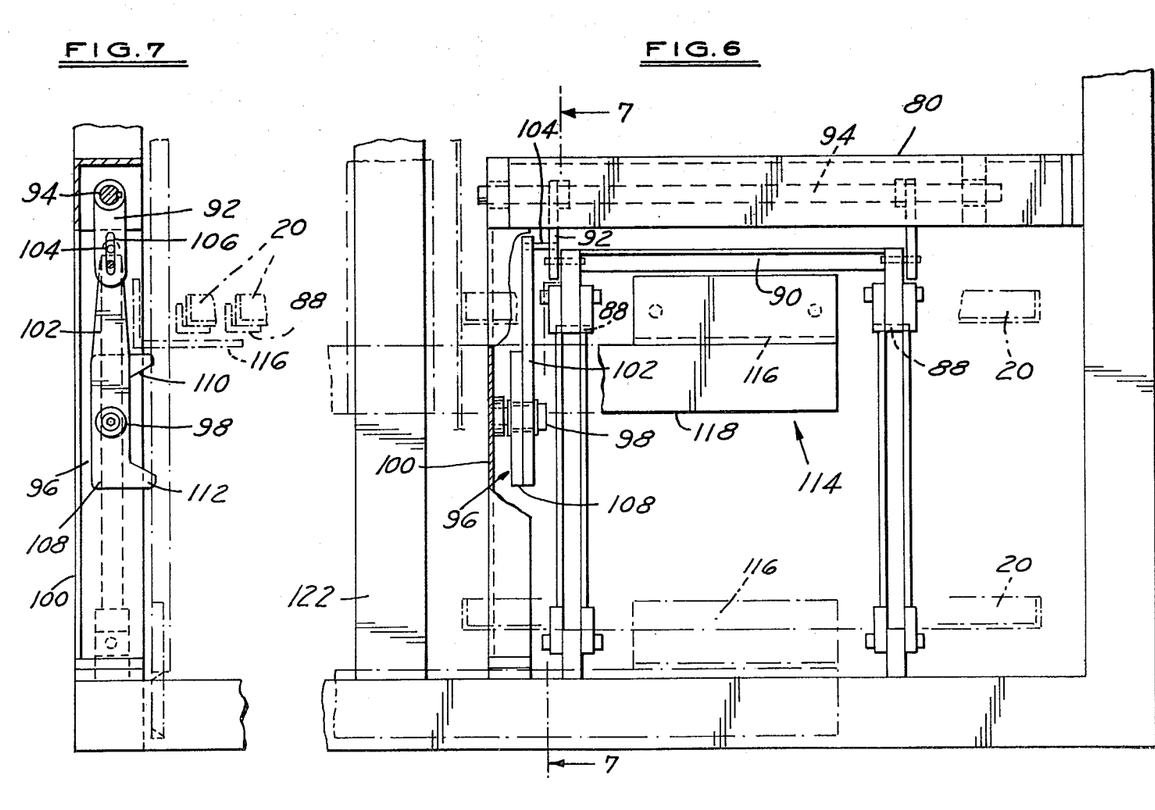
FIG. 6 is an enlarged fragmentary view of a portion of the FIG. 4 structure.
FIG. 7 is a cross-sectional view taken along the plane of the line 7—7 of FIG. 6, and looking in the direction of the arrows.

Each pair of support arms 88 is secured adjacent opposite ends of a cross bracket 90. As shown in FIGS. 6 and 7, each cross bracket 90 is pivotally supported at its ends in respective slotted lever arms 92 which, in turn, are secured to a pivotally mounted actuator shaft 94. An escape lever assembly 96 in each compartment 86 includes a stub shaft 98 secured to a common side wall 100 of the magazine 26. A solid lever arm 102 has a pin 104 secured to its upper end and extended into the slot 106 of the adjacent slotted lever arm 92. The lever arm 102 is pivotally mounted a predetermined distance from its lower end around the stub shaft 98. A U-shaped escape lever 108 is secured to a side surface of the lever arm 102 such that its side portions serve as upper and lower escapement fingers 110 and 112 extending toward the center of each compartment 86 from the lower end of the lever arm 102 and from a midpoint of the lever arm 102, equal distances from the axis of the stub shaft 98, for a purpose to be described.

A retractable lift assembly 114 includes a carrier bracket 116 on each side of each compartment 86, interconnected by a bar 118 which is secured to a vertical arm 120. The latter is slidably mounted on a central pillar 122 of the magazine 26. A cross bracket 124 is secured at its ends to the oppositely disposed vertical arms 120. A suitable hydraulic or pneumatic cylinder 126 is centrally mounted on the framework such that its piston rod 126 is operatively connected to the cross bracket 124 for raising and lowering all four carrier brackets 116 for supplying a pair of dollies, as will be explained. A switch 128 (FIG. 4) is mounted on the magazine framework such that it is contacted by the retractable lift assembly 114 when the latter is raised.

A three-part basket guide rail 130 is secured to each inner side of the magazine 26, each central rail component being mounted between the carrier brackets 116 in adjacent compartments 86, while front and rear rail components are mounted adjacent the outer ends of the respective carrier brackets 116.

Stacking Mechanism

Figure 8:
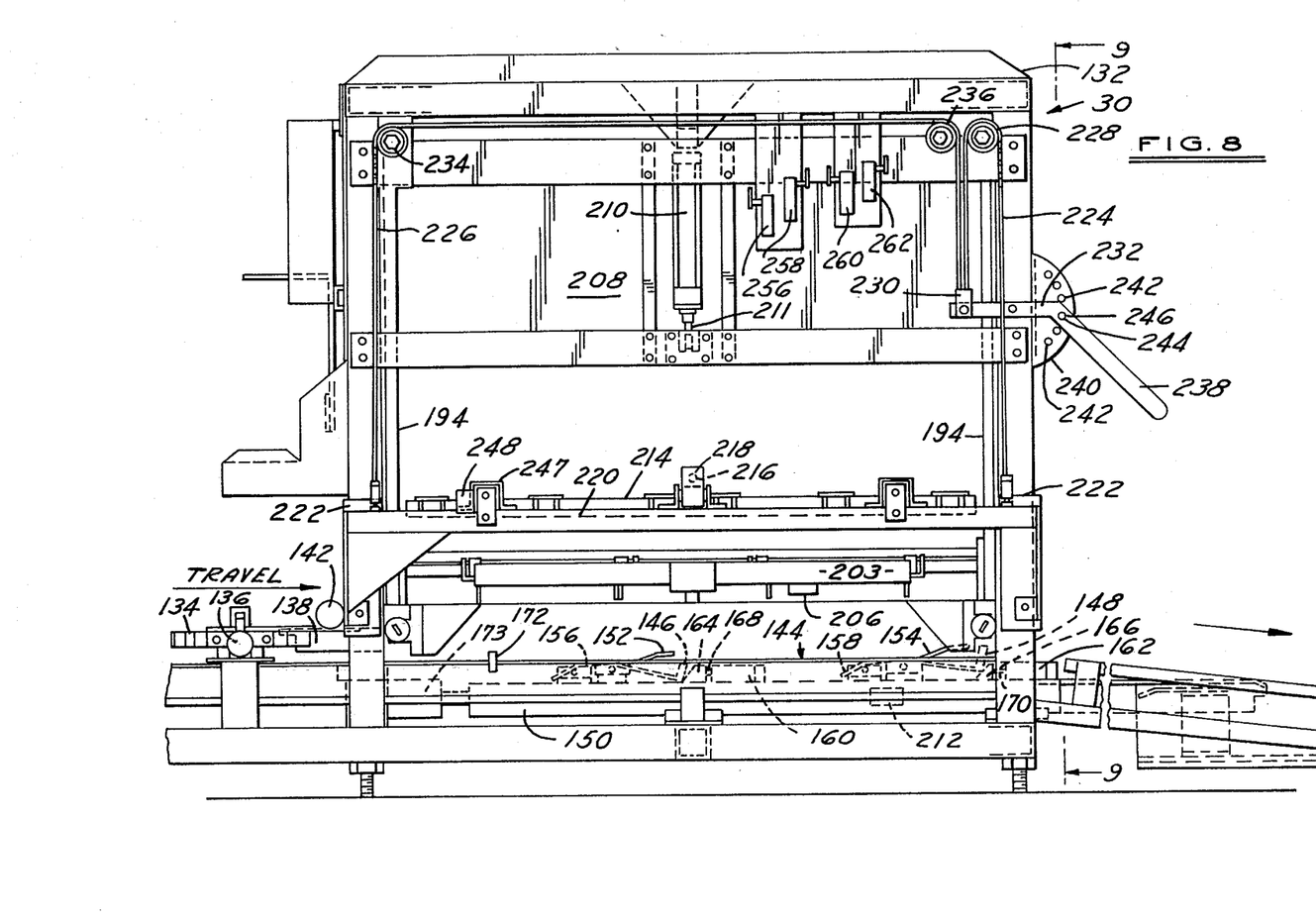
FIG. 8 is an enlarged side elevational view of the stacking mechanism portion of the invention.
Figure 9:
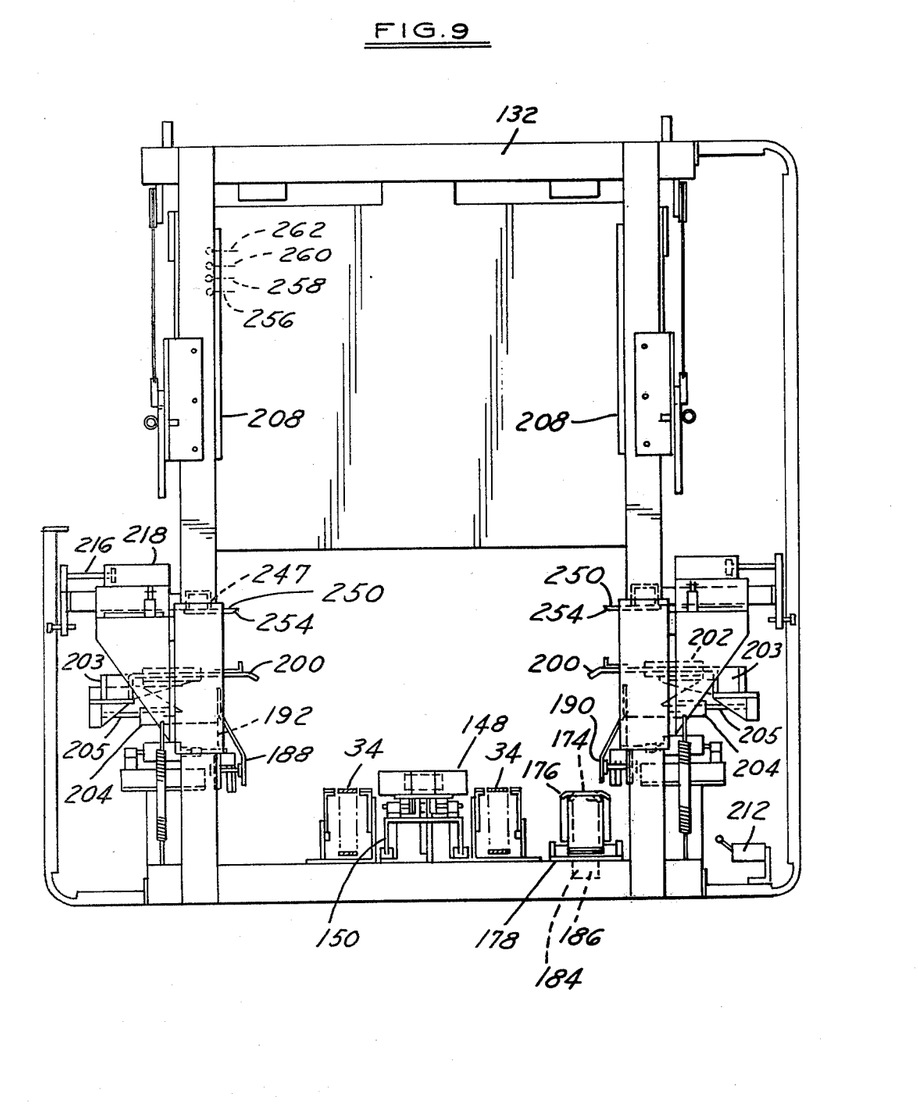
FIG. 9 is an end view taken along the plane of the line 9—9 of FIG. 8, and looking in the direction of the arrows.

Referring now to FIGS. 8 and 9, the stacking mechanism 30 is seen to include framework 132 providing aligned, dual compartment stacking means downstream of, and spaced a predetermined distance apart from, the magazine 26. In the space therebetween there is located oppositely disposed, reciprocally mounted clamping members 134, each actuated by a suitable hydraulic or pneumatic cylinder 136. A guide rail 138 is adjustably mounted adjacent each clamping member 134. An electric eye light source 140 (FIG. 10) and receiver 142 are mounted so as to be operative directly across the conveyor chains 34 adjacent the downstream ends of the oppositely disposed guide rails 138, just ahead of the entrance to the dual compartment framework 132.

A stop mechanism 144, including a pair of spaced apart, pivotally mounted stop members 146 and 148, is mounted on a slidably mounted channel member 150 within the dual compartment framework 132, intermediate the laterally spaced conveyor chains 34. Stop actuators 152 and 154 are pivotally mounted just ahead of the respective stop members 146 and 148. The stop actuators 152 and 154 are adapted to actuate respective switches 156 and 158 which, in turn, are operatively connected to respective hydraulic or pneumatic cylinders 160 and 162. Respective tapered members 164 and 166 are formed on the distal ends of the piston rods 168 and 170 of the cylinders 160 and 162 serving to raise and lower the respective pivotally mounted stop members 146 and 148. A "bounce-back" stop member 172 may be pivotally mounted a predetermined distance upstream of the first stop member 146. A suitable hydraulic or pneumatic cylinder 173 is positioned adjacent the front end of the channel member 150 for moving the latter, as will be explained.

A pair of spaced apart dolly detection pedals 174 and 176 are mounted on a channel member 178. The pedals 174 and 176 are urged by suitable biasing means (not shown) into an up-standing position. The dolly detection pedals, when depressed by oncoming dollies 20, are adapted to actuate respective switches 184 and 186 for a purpose to be explained.

A pair of aligned, spaced guide plates 188 and 190 (FIG. 9) are secured to a side rail 192 on each side of the stacking mechanism 30. Each side rail 192 is secured at its ends to respective vertical lift members 194. An L-shaped bracket 198 is secured adjacent its ends to a pair of spaced laterally extending lift plates 200, which are mounted on the respective vertical lift members 194 and adapted to slide laterally along edge guide members 202 so as to extend beyond the respective side rails 192 toward and away from the center of the framework 132. The spaced lift plates 200 are interconnected at their outer ends by a mounting bar 203. A pair of hydraulic or pneumatic cylinders 204 (FIG. 9) are mounted on the side rails 192 such that the distal ends of the piston rods 205 thereof are secured to a midpoint of the mounting bar 203. An electrical switch 206 is mounted on the framework 132 so as to be actuated by the bottom surface of one of the laterally extending lift plates 200 on each side upon retraction of the mounting bar 203 by the respective cylinder 204. A vertical lift plate or wall member 208 is slidably mounted on the side rails 192 across each side of the stacking mechanism 30. Suitable balanced hydraulic or pneumatic cylinders 210 are mounted on the framework 132 adjacent the outer surface of the respective wall members 208, with the piston rods 211 thereof secured to the respective wall members. An electrical switch 212 is mounted on the frame 14 so as to be contacted by the mounting bar 203 when the latter is down.

A support rail 214 is selectively adjustably mounted with respect to its elevation intermediate the side rails 192, and is connected to the piston rods 216 of spaced cylinders 218. The latter are mounted on a channel member 220 whose end portions are secured to slide members 222 slidably mounted around the vertical framework 132. Outside of each wall member 208 a pair of chains 224 and 226 are each connected at one end thereof to an end of the channel member 220. The chain 224 is mounted around a sprocket 228 rotatably mounted on an upper portion of the framework 132, and secured at its other end to a plate 230 pivotally connected to one end of a lever arm 232. The chain 226 is mounted around two spaced sprockets 234 and 236, one of which is located immediately adjacent the sprocket 228, with its other end secured to the plate 230. The lever arm 232 is pivotally mounted at an intermediate point thereof to the framework 132, with a handle 238 extending therefrom. An adjustment plate 240 having a plurality of perforations 242 formed therein, is secured to the framework 132 adjacent the pivot point of the lever arm 232. The handle 238 is selectively attached to the adjustment plate 240 via a pin 244 mounted through an opening 246 formed in the handle 238 and thence through a predetermined one of the perforations 242 for selectively establishing the operative height of the channel member 220 and, hence, the height of the support rail 214.

A plurality of spaced brackets 247 are secured to the support rail 214. An electrical switch 248 is positioned just behind one of the brackets 247 for at times being actuated thereby. A spring loaded finger 250 is slidably mounted in each bracket 247 and urged laterally toward the inside of the framework 132 so as to normally extend just past the vertical plane of the respective guide plates 188 and 190. The end of each finger 250 is formed to include a taper 254 such that any contact from below, by a basket tray, for example, will urge the fingers back into the respective brackets 247, against the force of suitable biasing means (not shown), while permitting the basket tray to move upwardly therepast.

Four electrical switches 256, 258, 260 and 262 are adjustably mounted on the framework 132 adjacent the upper edge thereof. The switches 256 and 258 are operatively connected to the cylinders 218 and initially manually positioned so as to be actuated by the wall member 208 during cycles involving respective tall and short basket trays 16 to cause the cylinders to retract the support rails 214 and, hence, the fingers 250. The switch 260 is also operatively connected to the cylinders 218 and positioned so as to be actuated by the wall member 208 during the cycle involving dollies 20. The switch 262 serves to cause the cylinders 210 to be actuated upon contact thereof by the wall member 208 to cause the latter to lower.

A cylinder 264 is mounted adjacent the upstream end of the channel member 150 and adapted to cause the latter and its associated stop members 146 and 148 to move forward a predetermined distance, say, one inch, in the event the dollies 20 are slightly longer than the basket trays 16.

A conventional drive mechanism 266 for the two conveyor chains 34 is located adjacent the outlet end of the stacking mechanism 30 beneath a cover member 268. A pair of runways 270 are secured adjacent the outer side of the exit end of each of the respective conveyor chains 34 for receiving the discharged assemblies of a plurality of basket trays 16 stacked on dollies 20.

A reset switch 272 is mounted along an edge portion of one of the runways 270 a predetermined distance downstream of the inlet end of the runway 270 to reset the stacking mechanism.

A control panel 274 houses a counter 275, a conventional twelve-position step switch 276 having a plurality of independent wafer switches (FIG. 11) associated therewith, along with conventional control relays, solenoids, and time delay units, as required for the following operation.

OPERATION

As basket trays 16 enter the conveyor 12 they are carried by the conveyor chains 34 over the switch 38 located between the conveyor chains 34. With each depression of the switch 38, a count on the counter 275 is recorded, and the cylinder 40 is actuated to cause the pivotable stop member 36 to momentarily raise. Such action delays the next succeeding basket tray, thereby providing a spacing between successive trays, insuring an accurate count.

The first basket tray 16 is conveyed downstream until it contracts the switch 156, stepping the step switch 276 into position 2 from its starting position 1. As may be noted in FIG. 11, SSW1 is closed, activating a first time delay (TD1).

The cylinders 136 close the clamping members 134, provided the light beam between the source 140 and receiver 142 is broken by the presence of the second basket tray 16. This serves to provide a spacing between the first and second basket trays. When TD1 times out, the clamping members 134 are released, and the step switch 276 is stepped into position 3. The stop member 146 is normally retracted. Once the first basket tray actuates the switch 158, the stop member 146 is raised, stopping the second basket tray, and the step switch 276 is stepped into position 4.

When the second basket actuates the switch 156, a suitable control relay is energized, and a second time delay (TD2) is activated. The third basket, in turn, is clamped by the clamping members 134 since it is blocking the electric eye 140/142. When TD2 times out, the step switch 276 is stepped into position 5. At this point SSW3 (FIG. 11) is closed and the lift plates 200 are caused to move inwardly to locations beneath the first and second baskets so as to be able to support and raise same. As the lift plates 200 pass the half way point on their way inward, the switch 206 is actuated, stepping the step switch 276 into position 6. SSW10 (FIG. 11) causes the third basket to be held by the clamping members 134 while the step switch 276 is in positions 5 and 6.

With the step switch 276 in position 6, SSW4 (FIG. 11) is closed, and a suitable lift solenoid is energized, causing the cylinder 210 to raise the vertical wall members 208, the associated lateral lift plates 200, and, hence, the first pair of baskets.

Once one of the wall members 208 contacts either the switch 256 or the switch 258, one of which will have been selected to be operational, depending upon whether tall baskets or short baskets are being processed, a suitable solenoid will be energized, causing the cylinders 218 to withdraw the support rail 214 and, hence, the fingers 250. The step switch 276 is stepped into position 7 and then into position 8.

Once the one wall member 208 contacts the switch 262, the step switch 276 is stepped into position 9. As the step switch leaves position 8, SSW4 (FIG. 11) opens, causing the support rail 214 and its associated fingers 250 to return to an inner position beneath the two baskets to support same. At this point the switch 248 is actuated, stepping the step switch 276 into position 10, whereupon SSW9 (FIG. 11) closes, energizing a solenoid to cause the cylinder 210 to lower the wall members 208 and the lift plates 200. The step switch 276 is stepped into positions 11 and 12, and back to position 1, while SSW7 (FIG. 11) causes the cylinder 210 solenoid to remain energized through position 4 during which the members 208 and 200 remain down.

Figure 11:
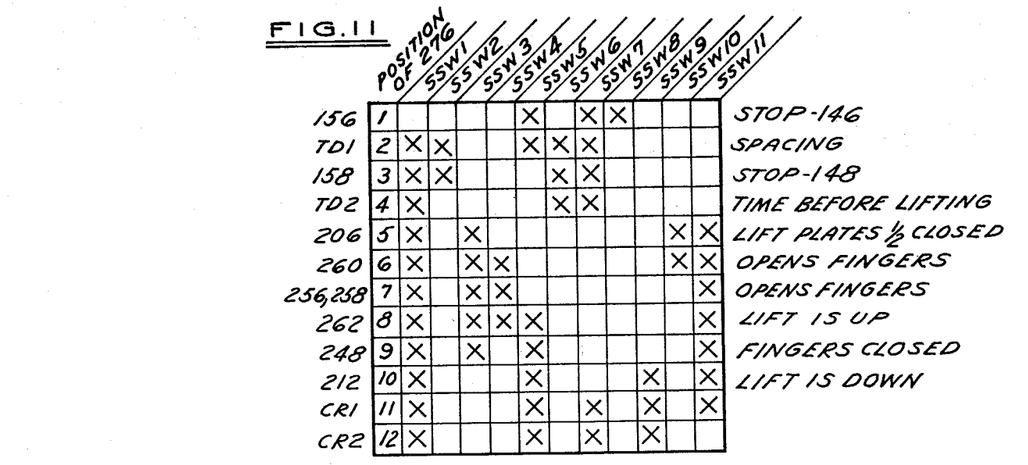
FIG. 11 is a graphical representation illustrating various operational steps of the invention.

Now, concurrently with the last several of the above described steps, and as may be noted in FIG. 11, once the step switch 276 steps out of position 6, SSW10 opens, causing the clamping members 134 to open, releasing the third basket. When the third basket actuates the switch 156, the step switch 276 will be past position 8, at which point SSW5 (FIG. 11) closes, providing for the clamping of the fourth basket. When the third basket actuates the switch 158, the stop member 146 is raised and the step switch 276 is stepped into position 2 to thereafter repeat the above described cycle.

Repeated cycles will continue, with the counter 275 keeping the basket count via the repeated actuation of the switch 38 by the incoming baskets. Once the counter 275 has counted a predetermined number of baskets, say 30, resulting in 15 baskets per stack, the stop member 36 is caused to raise, stopping the oncoming baskets. In the event of a miscount for any reason, say a count of 29 instead of 30, SSW8 (FIG. 11) being closed during step switch 276 positions 2, 3 and 4 will cause the operation to continue without interruption. When the last basket has cleared the dolly feed area, as indicated by the electric eye 70/72, the following sequence begins, assuming that there are dollies 20 waiting on the chute 18. The presence of the dollies serves to actuate the switch 60 and, thus, permit the counter 275 to energize a suitable solenoid for actuating the cylinder 64 to lower the end portion 62.

With the lowering of the end portion 62, the switch 58 is actuated, causing the cylinder 50 to raise or open the stop member 44 and thus allowing two dollies 20 to roll down the chute 18 and the lowered end portion 62.

As the first dolly enters the lift area, the switch 186 is actuated by the contact of one dolly front wheel against the dolly detection pedal 176. In those applications where the dollies are a different size than the baskets, with the step switch in position 1, SSW8 (FIG. 11) will be closed, energizing suitable control relays which cause the cylinder 173 to slide the channel member 150 downstream a predetermined amount, say one inch, to accommodate the basket size. SSW8 also will serve to energize suitable control relays, represented in FIG. 11 as CR1 and CR2. The latter will remain energized until the discharge of both stacks is completed, as will be explained.

When the first dolly actuates the switch 156, the step switch 276 is stepped into position 2. The second dolly will then be clamped by the clamping members 134 since it is blocking the electric eye 140/142. As before with the baskets, when the step switch 276 gets into position 2, SSW2 (FIG. 11) is closed, activating TD1. When TD1 times out, the clamping members 134 are released, and the step switch 276 is stepped into position 3.

When the first dolly actuates the switch 158, the stop member 146 is raised, and the step switch 276 is stepped into position 4. When the second dolly actuates the switch 156, TD2 is activated. Also, once a dolly wheel contacts the pedal 174 and activates the switch 184, the chute end portion 62 and stop member 46 are raised, permitting two more dollies to enter the chute 18 to be stopped by the stop member 44, and the stop member 36 is opened to allow baskets to be fed. The next basket is clamped momentarily by the clamping members 134, once it blocks the electric eye 140/142. With the switch 186 activated, when TD2 times out, the drive mechanism 266 will be signalled so as to reduce the speed of the conveyor 12 and step the step switch 276 into position 5. Thereafter, the steps continue to remain the same until the wall member 208 is raised sufficiently to actuate the switch 260, rather than actuating either of the switches 256 or 258 which, as indicated above, were actuated by respective tall or short baskets. This energizes a solenoid to cause the cylinders 218 to withdraw the support rail 214 and, hence, the fingers 250. As before, the step switch 276 is stepped into position 7 and then again into position 8.

One wall member 208 contacts the switch 262, and the step switch 276 is stepped into position 9. As the step switch leaves position 8, SSW4 opens, normally causing the support rail 214 and its associated fingers 250 to return to an inner position, however, closure of the fingers 250 is prevented by virtue of the above mentioned energization of relays CR1 and CR2.

When the step switch 276 attains position 9, it is stepped again into position 10 as a result of the CR1 and CR2 contacts. While in position 10, SSW9 (FIG. 11) closes, causing the stop member 148 to retract and the cylinder 210 to lower the wall members 208 and the lift plates 200. Lowering of the latter actuates the switch 212 and results in the step switch 276 being stepped into position 11.

While the step switch is in position 11, the assembly of the two stacks of baskets on a pair of dollies is being discharged by the conveyor 12 from the stacking mechanism 30. When the reset switch 272 is actuated by the leading stack, suitable relays are energized to reset the stacking mechanism, i.e., to cause the stop member 148 to raise and the clamping members 134 to open, releasing a basket, while setting up a time delay mechanism to allow the second stack time to be discharged before once again speeding up the conveyor. Also the control relays CR1 and CR2 are deenergized, causing the step switch 276 to be stepped out of position 11 and 12, and back to position 1. The sequence of events then starts over again, as described above.

Now, in the event there are no dollies in the chute 18, the paddles 54 and 56 will not be contacted and, hence, the switches 58 and 60 will not be actuated. In such a case, a suitable separate control relay will be energized and latched, and once the baskets are clear of the dolly feed area, as indicated by the electric eye 74/76, a suitable solenoid will be energized, causing the cylinder 126 to raise the cross bracket 124 and, hence, the four carrier brackets 124. As the connector bars 118 contact the upper escapement fingers 110, through the resultant pivotal motions of the lever arms 102, the pins 104, the slotted arms 92, and the brackets 90, the support arms 88 are caused to be withdrawn, releasing two dollies onto the carrier brackets 124.

This operation actuates the switch 128, energizing a suitable time delay mechanism. When the latter times out, a solenoid is energized, causing the cylinder 126 to lower the lift assembly 114. While lowering, the connector bars 118 contact the lower escapement fingers 112, causing the support arms 88 to move inwardly beneath the second tier of dollies to support same until the next cycle. Once the two dollies are completely lowered, they are conveyed by the conveyor into the stacking lift area to repeat the steps described above relative to dollies entering the lift area from the chute 18 and the pivotable end portion 62.

It should be apparent that the invention provides a novel conveying and stacking arrangement for repeatedly combining a preselected number of basket trays and dollies automatically, with provisions for automatically releasing the dollies from one of two storage areas.

While but one embodiment of the invention has been shown and described, other modifications thereof are possible.

We claim:

1. A conveying and stacking machine for handling basket trays and dollies, said machine comprising conveyor means adapted to receive and convey basket trays and dollies; holding means mounted at a predetermined converging angle above the entrance portion of said conveyor and adapted to receive dollies; an end portion pivotally connected to the downstream end of said holding means for at times pivoting into close proximity to said conveyor substantially along said predetermined angle; counting means for lowering said end portion and releasing a plurality of dollies from said holding means and lowered end portion onto said conveyor means once a predetermined number of basket trays has been conveyed; and stacking means for receiving said basket trays at a predetermined location along said conveyor means, automatically stacking said basket trays in a plurality of aligned stacks, and releasing said plurality of stacks onto said plurality of dollies, said conveyor means conveying the assembled basket tray and dolly stacks beyond said predetermined location.

2. A conveying and stacking machine for handling basket trays and dollies, said machine comprising a conveyor adapted to receive and convey basket trays and dollies; holding means mounted at a predetermined converging angle above the entrance portion of said conveyor and adapted to receive dollies, and end portion pivotally connected to the downstream end of said holding means for at times pivoting into close proximity to said conveyor along said predetermined angle, a second holding means for storing two aligned stacks of dollies above said conveyor, a stacking mechanism for receiving said basket trays in aligned pairs, and means for automatically stacking said basket trays in said stacking mechanism in two aligned stacks of a predetermined number per stack, lowering said end portion, releasing a pair of dollies from one of said holding means and said magazine, said dollies receiving said respective stacks of basket trays and said conveyor conveying the two assembled basket tray and dolly stacks to the exit portion of the conveyor.

3. A conveying and stacking machine for handling basket trays and dollies, said machine comprising a dual-speed conveyor adapted to receive and convey basket trays and dollies at a predetermined speed, holding means mounted at a predetermined converging angle above the entrance portion of said conveyor and adapted to receive dollies when available, an end portion pivotally connected to the downstream end of said holding means for at times pivoting into close proximity to said conveyor, storage means for storing two aligned stacks of dollies above said conveyor, a stacking mechanism for receiving said basket trays in aligned pairs at a predetermined location along said conveyor means, stacking means for automatically stacking said basket trays in said stacking mechanism above said conveyor in two aligned stacks of a predetermined number per stack and signalling for a pair of dollies from one of said holding means and said storage means, means operatively connected to said stacking means for lowering said end portion and releasing a pair of dollies from said holding means and said end portion onto said conveyor for conveyance to said stacking mechanism when dollies are present in said holding means, or otherwise for lowering a pair of dollies from said storage means onto said conveyor for conveyance to said stacking mechanism, said stacking means serving to raise said dollies to receive said respective stacks of basket trays and lowering the two assembled basket tray and dolly stacks onto said conveyor for conveyance to the exit position of the conveyor.

4. A conveying and stacking machine for handling basket trays and dollies, said machine comprising a dual-speed conveyor adapted to receive and convey basket trays and dollies at a predetermined speed; a chute mounted at a predetermined converging angle above the entrance portion of said conveyor and adapted to receive dollies when available; an end portion pivotally connected to the downstream end of said chute for at times pivoting into close proximity to said conveyor substantially along the plane of said chute; a magazine for storing two aligned stacks of dollies above said conveyor and including pivotally mounted retainer members and carrier members operatively connected to said retainer members and adapted to being raised for pivotting said retainer members to receive a pair of dollies therefrom and lowering same to the conveyor; stacking mechanism for receiving said basket trays in aligned pairs at a predetermined location along said conveyor means: stacking means including slidably mounted retainer member, lift plates adapted to being raised so as to raise basket trays to a position wherein such trays may be supported by said retainer members, and electrical switch and hydraulic cylinder means for coordinating the movements of said retainer members and said lift plates for stacking said basket trays on said retainer members in two aligned stacks of a predetermined number per stack; counting means responsive to movements of said basket trays for lowering said chute end portion and releasing a pair of dollies from said chute onto said conveyor for conveyance by said conveyor to said stacking mechanism after a predetermined count of basket trays has been reached and when dollies are present in said chute or, otherwise, for actuating said carrier members to release a pair of dollies from said magazine onto said conveyor for conveyance by said conveyor to said stacking mechanism; and electrical switch means responsive to movements of said pair of dollies along said conveyor for decreasing the speed of said conveyor; said lift plates serving to raise said dollies to receive said respective stacks of basket trays from said retainer members and lowering the two assembled basket tray and dolly stacks onto said conveyor for conveyance at a decreased speed to the exit position of the conveyor.

5. A conveying and stacking machine for handling basket trays and dollies, said machine comprising a dual-speed conveyor adapted to receive and convey basket trays and dollies at a predetermined speed; a chute mounted at a predetermined converging angle above the entrance portion of said conveyor and adapted to receive dollies when available; an end portion pivotally connected to the downstream end of said chute for at times pivoting into close proximity to said conveyor substantially along the plane of said chute; stacking mechanism for receiving said basket trays at a predetermined location along said conveyor means; stacking means including slidably mounted retainer members, lift plates adapted to being raised so as to raise said individual basket trays to a position wherein such trays may be supported by said retainer members, and electrical switch and hydraulic cylinder means for coordinating the movements of said retainer members and said lift plate for stacking said basket trays on said retainer members in a predetermined number; counting means responsive to movements of said basket trays for lowering said chute end portion and releasing at lease one dolly from said chute onto said conveyor for conveyance by said conveyor to said stacking mechanism after a predetermined count of basket trays has been reached and when dollies are present in said chute; and electrical switch means responsive to movements of said at least one dolly along said conveyor for decreasing the speed of said conveyor; said lift plates serving to raise said at least one dolly to receive said stack of basket trays from said retainer members and lowering the assembled basket tray and dolly stack onto said conveyor for conveyance at a decreased speed to the exist position of the conveyor.

6. A conveying and stacking machine for handling basket trays and dollies, said machine comprising a dual-speed conveyor adapted to receive and convey basket trays and dollies at a predetermined speed; a magazine for storing dollies above said conveyor and including pivotally mounted retainer members and carrier members operatively connected to said retainer members and adapted to being raised for pivoting said retainer members to receive at least one dolly therefrom and lowering same to the cnveyor; stacking mechanism for receiving said basket trays at a predetermined location along said conveyor means; stacking means including slidably mounted retainer members, lift plates adapted to being raised so as to raise said individual basket trays to a position wherein such trays may be supported by said retainer members, and electrical switch and hydraulic cylinder means for coordinating the movements of said retainer members and said lift plates for stacking said basket trays on said retainer members in a predetermined number; counting means responsive to movements of said basket trays for actuating said carrier members to release said at least one dolly from said magazine onto said conveyor for conveyance by said conveyor to said stacking mechanism; and electrical switch means responsive to movements of said at least one dolly along said conveyor for decreasing the speed of said conveyor; said lift plates serving to raise said at least one dolly to receive said stack of basket trays from said retainer members and lowering the assembled basket tray and dolly stack onto said conveyor for conveyance at a decreased speed to the exit position of the conveyor.

7. A conveyor and stacking machine for handling basket trays and dollies, said machine comprising a dual-speed conveyor adapted to receive and convey basket trays and dollies at a predetermined speed; storage means mounted in line with said conveyor and adapted to hold dollies; means for releasing at least one dolly from said storage means onto said conveyor; stacking mechanism for receiving said basket trays at a predetermined location along said conveyor means; stacking means including slidably mounted retainer members, lift plates adapted to being raised so as to raise said individual basket trays upwardly and thereby raise all preceding basket trays to a position wherein such trays may be supported by said retainer members, and electrical switch and cylinder means for coordinating the movements of said retainer members and said lift plates for stacking said basket trays on said retainer members in a predetermined number; counting means responsive to movements of said basket trays for actuating said releasing means to release said at least one dolly from said storage means onto said conveyor for conveyance by said conveyor to said stacking mechanism; and electrical switch means responsive to movements of said at least one dolly along said conveyor for changing the speed of said conveyor; said lift plates serving to raise said at least one dolly to receive said stack of basket trays from said retainer members and lowering the assembled basket tray and dolly stack onto said conveyor for conveyance at a decreased speed to the exit position of the conveyor.

8. A conveying and stacking machine for handling basket trays and dollies, said machine comprising a dual-speed conveyor adapted to receive and convey basket trays and dollies at a predetermined speed; storage means mounted in line with said conveyor and adapted to hold dollies; means for releasing at least one dolly from said storage means onto said conveyor; stacking mechanism for receiving said basket trays at a predetermined location along said conveyor means; stacking means including oppositely disposed slidably mounted retainer members, lift plates adapted to slide laterally inwardly to locations beneath each basket tray from opposite sides thereof and being raised so as to raise said individual basket trays upwardly and thereby raise all preceding basket trays to a position wherein such trays may be supported by said retainer members, solenoid means for raising said inwardly extended lift plates, and electrical switch and cylinder means for coordinating the movements of said retainer members and said lift plates so as to extend said retainer beneath said basket tray for stacking said basket trays on said retainer members in a predetermined number and lowering said lift plates; counting means responsive to movements of said basket trays for actuating said releasing means to release said at least one dolly from said storage means onto said conveyor for conveyance by said conveyor to said stacking mechanism; and electrical switch means responsive to movements of said at least one dolly along said conveyor for changing the speed of said conveyor; said lift plates serving to raise said at least one dolly to receive said stack of basket trays from said retainer members and lowering the assembled basket tray and dolly stack onto said conveyor for conveyance at a decreased speed to the exit position of the conveyor.

9. A conveying and stacking machine for handling basket trays and dollies, said machine comprising a dual-speed conveyor adapted to receive and convey basket trays and dollies at a predetermined speed; a chute mounted at a predetermined converging angle above the entrance portion of said conveyor and adapted to receive dollies when available; an end portion pivotally connected to the downstream end of said chute for at times pivotting into close proximity to said conveyor substantially along the plane of said chute; a magazine for storing dollies above said conveyor and including pivotally mounted retainer members and carrier members operatively connected to said retainer members and adapted to being raised for pivotting said retainer members to receive at least one dolly therefrom and lowering same to the conveyor; stacking mechanism for receiving said basket trays at a predetermined location along said conveyor means; stacking means including slidably mounted retainer members, lift plates adapted to being raised so as to raise said basket trays to a position wherein such trays may be supported by said retainer members, and electrical switch and hydraulic cylinder means for coordinating the movements of said retainer members and said lift plates for stacking said basket trays on said retainer members in a predetermined number; counting means responsive to movements of said basket trays for lowering said chute end portion and releasing a pair of dollies from said chute onto said conveyor for conveyance to said stacking mechanism after a predetermined count of basket trays has been reached and when dollies are present in said chute or, otherwise, for actuating said carrier members to release said at least one dolly from said magazine onto said conveyor for conveyance by said conveyor to said stacking mechanism; and electrical switch means responsive to movements of said at least one dolly along said conveyor for decreasing the speed of said conveyor; said lift plates serving to raise said at least one dolly to receive said stack of basket trays from said retainer members and lowering the assembled basket tray and dolly stack onto said conveyor for conveyance at a decreased speed to the exit position of the conveyor.

10. A conveying and stacking machine for handling basket trays and dollies, said machine comprising a dual-speed conveyor adapted to receive and convey basket trays and dollies at a predetermined speed; a magazine for storing two aligned stacks of dollies above said conveyor and including pivotally mounted retainer members and carrier members operatively connected to said retainer members and adapted to being raised for pivotting said retainer members to receive a pair of dollies therefrom and lowering same to the conveyor; stacking mechanism for receiving said basket trays in aligned pairs at a predetermined location along said conveyor means; stacking means including slidably mounted retainer members, lift plates adapted to being raised so as to raise basket trays to a position wherein such trays may be supported by said retainer members, and electrical switch and hydraulic cylinder means for coordinating the movements of said retainer members and said lift plates for stacking said basket trays on said retainer members in two aligned stacks of a predetermined number per stack; counting means responsive to movements of said basket trays for actuating said carrier members to release a pair of dollies from said magazine onto said conveyor for conveyance by said conveyor said stacking mechanism; and electrical switch means responsive to movements of said pair of dollies along said conveyor for decreasing the speed of said conveyor; said lift plates serving to raise said dollies to receive said respective stacks of basket trays from said retainer members and lowering the two assembled basket tray and dolly stacks onto said conveyor for conveyance at a decreased speed to the exit position of the conveyor.

* * * * *